United States Patent
Hale

(10) Patent No.: US 7,039,798 B2
(45) Date of Patent: May 2, 2006

(54) METHOD AND APPARATUS TO ENABLE CROSS PLATFORM CONFIGURATION

(75) Inventor: Robert P. Hale, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 749 days.

(21) Appl. No.: 09/733,382

(22) Filed: Nov. 29, 2000

(65) Prior Publication Data

US 2002/0066008 A1     May 30, 2002

(51) Int. Cl.
G06F 15/177     (2006.01)
G06F 9/445     (2006.01)

(52) U.S. Cl. ............................................. 713/2; 713/1
(58) Field of Classification Search ................... 713/1, 713/2, 100; 712/220, 225
See application file for complete search history.

(56) References Cited

U.S. PATENT DOCUMENTS

| | | | | |
|---|---|---|---|---|
| 4,438,512 A | * | 3/1984 | Hartung et al. ............... | 714/49 |
| 5,335,329 A | * | 8/1994 | Cox et al. ..................... | 710/301 |
| 6,118,938 A | | 9/2000 | Lawman et al. | |
| 6,161,176 A | * | 12/2000 | Hunter et al. .................. | 713/1 |
| 6,493,751 B1 | * | 12/2002 | Tate et al. .................... | 709/221 |
| 6,502,187 B1 | * | 12/2002 | Miyagawa ................... | 712/225 |
| 6,564,318 B1 | * | 5/2003 | Gharda et al. ................ | 713/2 |

FOREIGN PATENT DOCUMENTS

| | | |
|---|---|---|
| JP | 10097457 A   * | 4/1998 |
| WO | WO 99/56447 | 11/1999 |
| WO | PCT/US01/50031 | 6/2003 |

OTHER PUBLICATIONS http://web.archive.org/web/19991222172400/www.westerndigital.com/service/ftp/disk-controllers.html.*
http://web.archive.org/web/19991013050531/officeupdate.microsoft.com/downloadCatalog/dldproject.htm.*
"Determine." The American Heritage Dictionary of the English Language, 1992, Houghton Mifflin Co., 3rd Ed.*
Peterson, P., "CMOS Memory Map", v1.24, Jan. 1995, Retrieved from the Internet: http://web.archive.org/web/19970806145755/http://irb.cs.uni-magdenburg.de/{zbrog/asm/cmos.html (5 pages, double-sided) XP002241241.

(Continued)

*Primary Examiner*—Thomas Lee
*Assistant Examiner*—Mark Connolly
(74) *Attorney, Agent, or Firm*—Joni D. Stutman-Horn

(57) ABSTRACT

A method includes generating a first signal defining 1) a location in a memory, and 2) a length in the memory of a second signal, the first signal having a cross-platform encoding. The first signal is stored such that it may be accessed by an application program.

12 Claims, 2 Drawing Sheets

OTHER PUBLICATIONS

BLUEFISH@SWIPENET.SE, "BIOS How to BIOS", Aug. 31, 2000, Retrieved from the Internet: http://web.archive.org/web/20000831024753/http://www.11a.nu/FILES/BIOS/SRC/DOS/ib00810.tgz (2 pages, double-sided) XP002241242.

Peterson, P., "CMOS Memory Map", v1.24, Jan. 1995, Retrieved from the Internet: http://web.archive.org/web/19970806145755/http://irb.cs.uni-magdeburg.de/{zbrog/asm/cmos.html (1 page) XP002241243.

BLUEFISH@SWIPENET.SE, "BIOS How to BIOS", Aug. 31, 2000, Retrieved from the Internet: http://web.archive.org/web/20000831024753/http://www.11a.nu/FILES/BIOS/SRCDOS/ib000810.tgz (2 pages, double-sided) XP002241244.

* cited by examiner

METHOD AND APPARATUS TO ENABLE CROSS PLATFORM CONFIGURATION

BACKGROUND

1. Field

The invention relates to the field of computer configuration and, more particularly, to the storage of computer configuration signals.

2. Background Information

Computer systems may store configuration signals in a memory. A computer system is any device including a processor capable of executing one or more instructions to generate signals. Such signals typically take the form of sequences of binary signals known as bits. Examples of computer systems are personal computers, workstation computers, server computers, hand held computers, and set top boxes to name just a few examples. Configuration signals are signals that may determine various settings for the operation of the computer system. For example, configuration signals may determine whether various input/output (I/O) ports comprised by the system are enabled, and I/O addresses for these ports. Configuration signals may determine other computer system settings as well. Such computer configuration signals are well known in the art as "set up information". On personal computers, setup information is also often stored in a memory known as a real time clock (RTC) complementary metal oxide silicon (CMOS).

Setup information may be applied prior to or during the booting of a program to control the computer system. Booting is the process of placing a sequence of instructions (a program) in control of various computer system resources. Resources include memory, interrupts, files, and I/O ports. An example of a program to boot is an operating system. An operating system is a program which controls various computer resources including those mentioned previously and further including typical I/O devices, such as a mouse and keyboard. Examples of operating systems are the Unix™ operating system and the Microsoft™ Windows™ operating system.

Setup information may be read, altered, and written back to a CMOS or other memory, where it is stored using a special program called a "setup program." The setup program may be part of the sequence of instructions comprising the computer system's power-on self test (POST) program. Often, the POST executes prior to the basic input/output system (BIOS) program of the computer system in order to initialize settings.

The settings determined by setup information may vary among different computer makes and models. Furthermore, the location and lengths of the bit sequences that comprise the setup information in the memory in which they are stored may vary. Accordingly, it may be difficult to create one set up program to read, alter, and write back set up) information for various makes and models of computer systems. Instead, multiple set up programs may be called for different makes and models of computer system.

Existing setup programs typically employ a crude "textual" interface. Textual interfaces are well known in the art and may comprise an 80×25 matrix of character positions. The number, type, and position of characters in a textual interface is limited as are the number of colors in which such characters may be displayed. It is well known that such textual interfaces are more limited than modem "graphical user interfaces" (GUI) which provide individual control of the color and position on a per pixel basis on the computer system display. Typically, it is the operating system which implements a graphical user interface for the computer system. However, setup programs may execute before the operating system boots, and, therefore, the setup program may employ a less sophisticated textual interface instead of a GUI.

Thus, there is a continuing need for a setup program which may operate with various makes and models of computer systems and which may take advantage of graphical user interface features provided by an operating system.

SUMMARY

In some embodiments, the invention includes a method includes generating a first signal defining 1) a location in a memory, and 2) a length in the memory of a second signal, the first signal having a cross-platform encoding. The first signal is stored such that it may be accessed by an application program.

Other aspects of the invention will become apparent to those skilled in the art in light of the following description and drawings. However, the scope of the present invention should be construed only in light of the appended claims.

BRIEF DESCRIPTION OF THE DRAWINGS

The subject matter regarded as the invention is particularly pointed out and distinctly claimed in the concluding portion of the specification. The invention, however, may be further understood by reference to the following detailed description read with reference to the accompanying drawings.

DETAILED DESCRIPTION

In accordance with one aspect of the present invention, signals which determine the size and location of setup information in memory are encoded in a cross-platform encoding. A cross-platform encoding is an encoding which is not specific to particular computer hardware or to a particular operating system. In one embodiment the cross-platform encoding comprises a hypertexed markup language (HTML) format, although any cross-platform encoding (for example, Extensible Markup Language) is within the scope of the present invention. Setup information may include, for example: settings to apply to the computer system when it is booted or reset; signals providing a human readable name to display for those settings; signals identifying option values for the settings; and signals identifying default values for the settings. The cross-platform encoded signals may be stored in an area of computer memory which is accessible to application programs and/or an operating system. An application program is a program well known in the art which executes under the control of an operating system to perform one or more tasks, such as word processing or analyzing a spreadsheet. The encoded signals may be transmitted over an external communications channel to a second computer system to enable a setup program executing remotely to configure the first computer system.

The external channel may be embodied in numerous ways. For example, the external channel may comprise a coupling to a local area network, or to the Internet. The external channel may comprise a coupling to the public telephone network using a data modem, or a coupling to a cable television network using a cable modem. Alternatively, the external channel may comprise a coupling to a satellite system by way of a satellite transceiver. These are only some of the many possibilities for an external channel. The HTML encoded signals may be sent over the external channel to a remote device. The remote device may comprise another computer system, among many possibilities.

Figure 1:
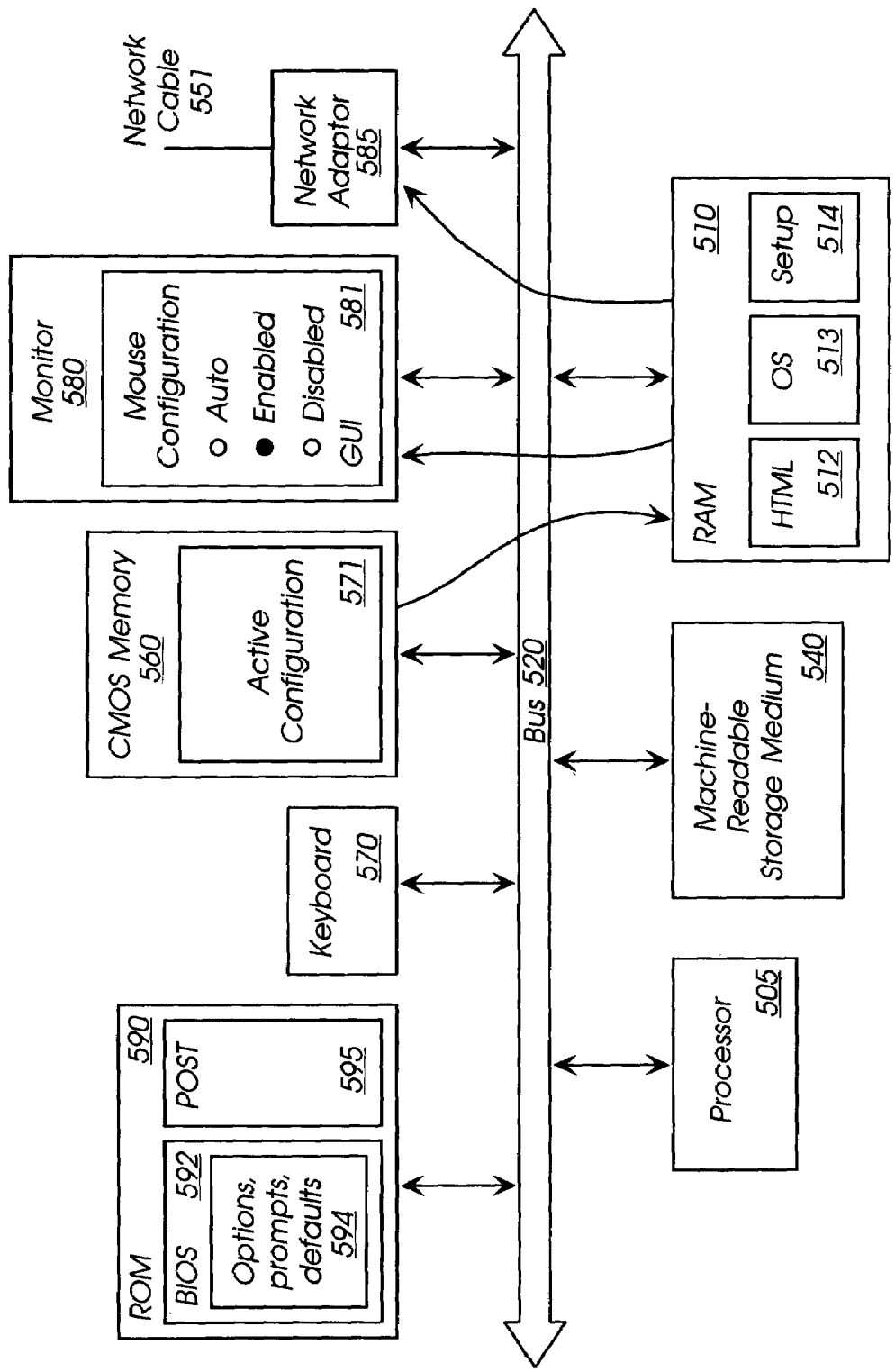
FIG. 1 is a block diagram illustrating an embodiment of a computer system in accordance with the present invention.

FIG. 1 is a block diagram illustrating an embodiment of a computer system in accordance with the present invention. Embodiment 500 comprises a processor 505 to execute instructions supplied by way of a bus 520. The executed instructions may be stored in a random access memory 510 (RAM) or a read-only memory 590 (ROM). From these locations the instructions may be supplied to the processor 505 by the bus 520 for execution. The processor 505 may be implemented using any semiconductor fabrication technology and may execute any instruction set including, but not limited to, instruction sets supported by an Intel Corporation Pentium® processor or compatible processor. The bus 520 may be implemented using technologies for propagating signals including, but not limited to, electronic and optical conductors. Those skilled in the art will appreciate that bus 520 may in fact comprise multiple segments with bus bridge interconnects. Embodiment 500 may include a machine-readable storage medium 540 to store one or more programs (instruction sequences) to be loaded into RAM 510. In one embodiment, the machine-readable medium 540 comprises a hard disk. However, the machine-readable storage medium 540 may also comprise a floppy disk, a CD-ROM or other optical disk, a read-only memory, or any other memory for storing instruction sequences.

To perform signal input/output, embodiment 500 may comprise a keyboard 570 and a display 580, each coupled to the bus 520 for transmitting data so that it may be easily accessed or manipulated by a user. Of course, other peripheral devices may be comprised by the system as well. The embodiment 500 may further include a network adapter 585 to couple the embodiment 500 to a network cable 551. Of course, the invention is not limited in scope to this particular embodiment.

In one embodiment, computer system 500 comprises setup information 571 stored by CMOS memory 560. Computer system 500 may further comprise a read only memory (ROM) 590 or flash memory storing BIOS instructions 592, POST instructions 595, and additional setup information 594. For clarity, the setup information 571 stored in CMOS 560 shall henceforth be referred to as the "active configuration signals". Setup information 594 stored in ROM 590 shall be referred to as "options and prompts signals". The active configuration signals 571 may comprise the settings to apply to the computer system embodiment 500 when it is powered on or reset. Powering on is the process of applying power to the computer system circuits, whereas reset is the process of restoring the powered on computer system circuits to a known state. Both power on and reset may be accomplished in a manner well known in the art.

Option and prompt signals 594 may include human readable sequences of characters to associate with the active configuration signals 571. Option and prompt signals 594 may also include options to select from when choosing an active configuration signal 571 for the computer system embodiment 500. Option and prompt signals 594 may also include default values for the active configuration signals 571. In one embodiment, BIOS 592 comprises the option and prompt signals 594. For example, BIOS 592 may comprise an option and prompt signal 594 in the form of a character sequence "COM 1". This character sequence may describe a serial port in the computer system 500. BIOS 592 may also comprise multiple strings (character sequences) describing the I/O addresses available for the serial port, and options for the port's enabled status (whether the port is usable or not). Address options may include 0x03F8, 0x02F8, and 0x02E8. Status options may include "enabled" and "disabled". Of course, these are merely examples of option and prompt signals 594 provided for the purpose of describing the present invention. Many other values are possible as well. A setup program may access the setup information in BIOS 592.

BIOS 592 may also comprise a default value for the active configuration signals 571. One example of a default value, for a serial port address, is 0x03F8. The computer system 500 may be configured to apply the default value when the corresponding active configuration signal 571 is corrupted or missing.

For example, CMOS memory 560 may comprise a signal representing the active serial port address setting to apply when the computer system is powered on or reset. Should the active address setting stored in CMOS 560 become corrupted or missing (by way of a power surge, for example), the default address signal may be applied when the system is powered on or reset. Of course, this is merely one example using a particular signal, and many other signals are contemplated within the scope of the invention.

Figure 2A:
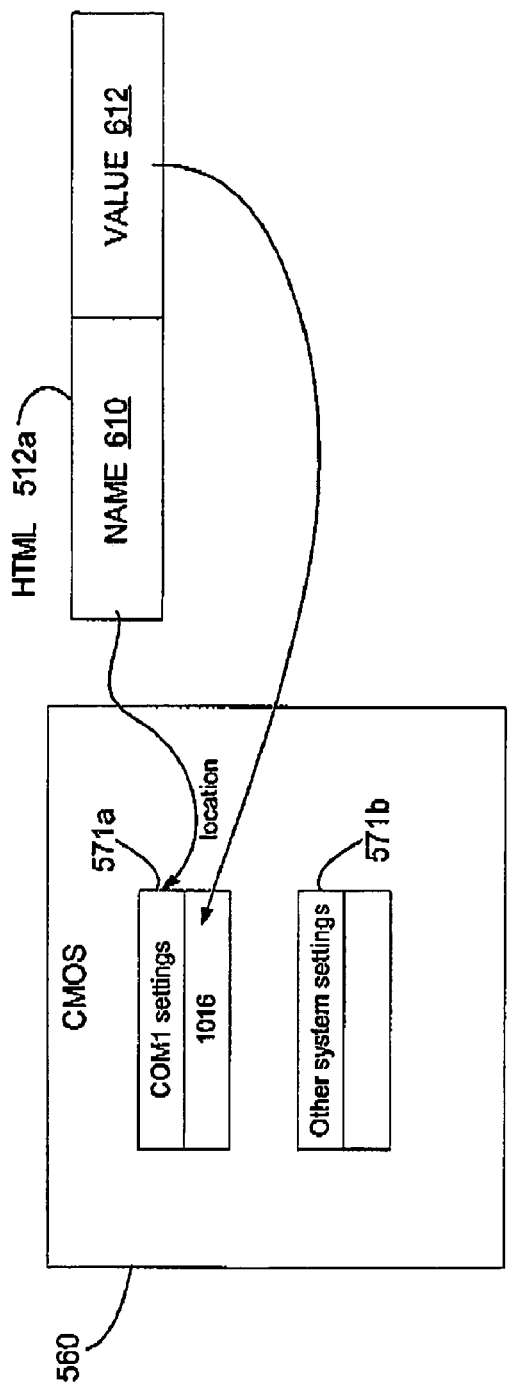
FIGS. 2A and 2B are block diagrams illustrating the structure of a configuration setting signal according to an embodiment of the invention.

In one embodiment, POST 595 contains one or more instructions to encode the size and location of one or more active configuration signals 571 in the memory which stores active configuration signals 571. Referring to FIG. 2A, there is shown an exemplary configuration setting signal 571a. In one embodiment, encoding may be accomplished using an HTML NAME field 610. POST may further contain one or more instructions to encode one or more active configuration signals 571 using an HTML VALUE field 612. These fields may, in one embodiment, be included as fields of an HTML INPUT tag 512a, in a manner described below.

Figure 2B:
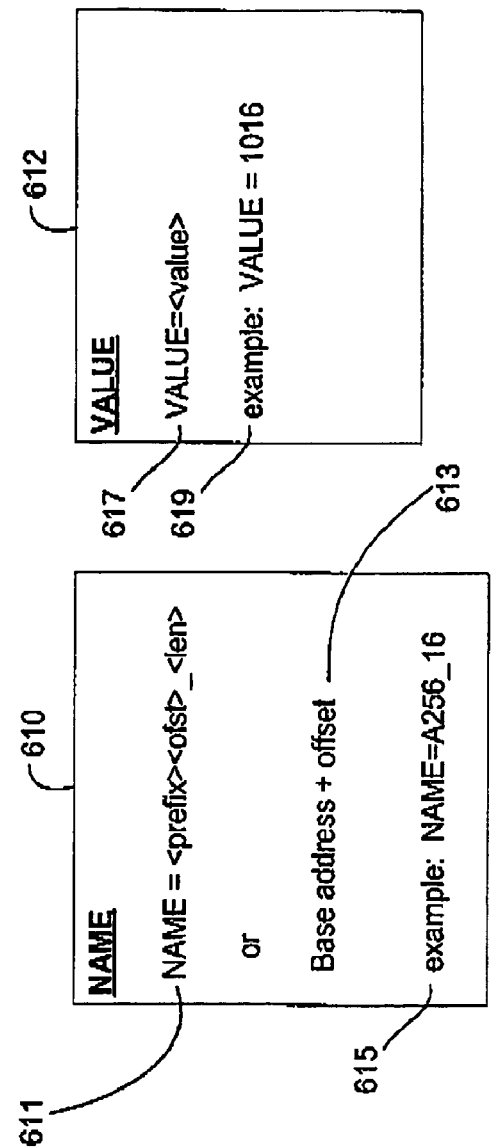

Referring to FIG. 2B, in one embodiment, the syntax to describe the size and location in memory of an active configuration signal is:

NAME <prefix><ofst>_<len>(611)

Where:

<prefix> is an alphabetic character that describes the checksumming to be applied to the active configuration signal. Checksumming is further described below.

<ofst> is the decimal offset of the first bit in the active configuration signal in memory.

<len> is the number of bits in the active configuration signal.

The <ofst>_<len> syntax may be repeated to describe signals which are noncontiguous in memory. The first <ofst>_<len> pair describes the least significant <len> bits of the signal, and the last pair describes the most significant bits. Of course, other techniques for describing the location of the signal are possible as well. For example, a location of the signal in memory may be defined using various well-known techniques, such as using a base address plus an offset value (613).

For example, the address in memory of the active configuration signal for the serial port address at a memory offset of 256 bits with a length of 16 bits maybe encoded as:

NAME=A256_16 (615)

This would signify checksumming type A for a signal of 16 bits in length starting at offset 256 decimal.

The value of the active configuration signal maybe encoded as a VALUE field 612, with the following syntax:

VALUE=<value>(617)

Where:

<value> is the decimal value of the signal.

For example, the value of an active configuration signal 571*a* for a serial port address of 0x03F8 (decimal 1016) may be encoded as:

VALUE=1016(619)

As previously described, the NAME 610 and VALUE 612 fields may be included as fields of an HTML INPUT tag 512*a*. For example:

<INPUT TYPE=radio NAME=A256_
16VALUE=1016>Default COM1 Address

This HTML sequence defines a radio button control (a well-known component of computer graphical user interfaces) entitled "Default COM 1 Address". If this radio button definition is included as part of an HTML form, and if the radio button is selected on the form, the form may return the sequence:

A256_16=1016

This return sequence describes the address, size, and value in memory of the active configuration signal for the address of COM 1.

The checksum character in the NAME field may be used to define a type of checksum calculation to apply to the configuration signal. For example, all signals defined with a checksum character of 'A' would be included in a single checksum calculation of a certain type. The type of the checksum calculation may be defined, in one embodiment, as either a 'range' checksum or a 'field' checksum.

In one embodiment, the range checksum mechanism works by summing a specified range of bytes. The field checksum mechanism works by summing up the values of multiple specified signals.

A range checksum may be specified by including a 'range' field in the HTML encoded signals.

RNG<stor>_<base>_<len>

Where

<stor> is the offset to store the resultant checksum, in bytes

<base> is the base address of a range of bytes to be included in the checksum

<len> is the number of bytes in the checksum range

Example:

RNG127_64_126=0

This field indicates that bytes 64 (decimal) through 126 should be added into a checksum and the result stored at byte offset 127. In one embodiment, the value following the '=' symbol is ignored.

A field checksum may be specified by including a 'FLD' field in the HTML encoded signals.

FLD<id>_<bitbase>_<bitnum>

Where:

<id> is a character between 'A' and 'Z'. This character may be used as the prefix character of the NAME fields indicating which checksum group an active configuration signal belongs to. All signals with the same checksum group may be summed and the result stored at the address specified by <bitbase>.

<bitbase> is the offset in memory, in bits, to store the checksum.

<bitnum> is the number of bits in the checksum value to store.

Example:

FLDA_760_8=0

This field specifies a field checksum for signals encoded with NAME fields having a prefix of "A". The field specifies that the checksum should be stored as an 8 bit value starting 760 bit positions from the starting address in memory. The value after the '=' sign is ignored.

To store the checksum value in multiple non-contiguous bit ranges, additional <bitbase>_<bitnum> pairs may be specified in the FLD field.

Memory, in particular CMOS memory, may in this embodiment be organized into multiple banks. These banks may be specified using a 'bank' field in the HTML encoded signals. Typically, such memory banks may be accessed using an index register to specify an input/output (I/O) command (read or write) and a bank number. The memory may also specify a data register used to read and write data to a bank. Typically, the index and data registers may be accessible by way of I/O addresses (as opposed to a memory addresses), in a manner well known in the art.

In one embodiment the syntax of a bank field may be specified as:

BNK<low>_<len>_<idx>_<data> where

<low> is the first decimal byte address of the memory bank

<len> is the number of bytes in the memory bank

<idx> is the decimal I/O address of a command register for specifying access commands to the bank (typically, either a read or write command).

<data> is the decimal I/O address of the data register for reading and writing data to the bank.

Example:

BNK_0_128_112_113=0.

This field specifies a bank of memory having a starting byte address of 0. The number of bytes of memory in the bank is 128. The I/O addresses of the index and date registers for accessing the bank are 112 and 113, respectively. The value after the '=' symbol is ignored.

A setup program may compare the addresses specified in NAME, RNG, and FLD fields to the address ranges specified for banks of memory by the BNK field(s). In this manner the setup program may determine which bank or banks of memory are implicitly specified by the field. Of course, a setup program running under the control of an operating system may only access the I/O addresses specified by the BNK field if such access is permitted by the operating system.

Some operating systems may not permit a setup program to directly access memory to read and write active configuration signals. Instead, such operating systems may employ procedure calls through which setup program may call to read and write to the memory.

For example, an operating system may support "Advanced Configuration and Power Interface Specification", Revision 1.0B, (www.teleport.com/~acpi) (ACPI) procedure calls for accessing the memory. An 'access' field may be included with the HTML encoded signals to describe the procedure calls to access the memory. In one embodiment the syntax of the access field may be specified as:

ACA<low>_<len>_<rdr>_<wrtr> where

<low> and <len> have the same interpretation as they do in the BNK field.

<rdr> is the name of a procedure to read active configuration signals from an address in the memory.

<wrtr> is the name of a procedure to write active configuration signals to an address in the memory.

POST 595 may contain additional instructions to encode option and prompt signals into HTML. Recall that option and prompt signals may comprise human readable character sequences to describe various active configuration signals, as well as options and default values for the active configuration signals. In one embodiment, the option and prompt signals are encoded as INPUT fields in an HTML FORM object. The following form provides an example.

Mouse Configuration
○ Auto
◉ Enabled
○ Disabled

The corresponding HTML (exclusive of the FORM tags) would be

<b> Mouse Configuration</b>
<input type=radio name=mouse value=au> Auto
<input type=radio name=mouse value=en checked> Enabled
<input type=radio name=mouse value=di> Disabled The <b> indicates that the following text should be bold. The </b> indicates that the bolding should be turned off. The "</" construct is the standard HTML mechanism to close a structured block.

The type=radio field indicates that the display should take the form of a radio button.

Radio buttons are well know GUI components that have only one alternative selected at a time. In this form, the NAME field performs two functions. The first is to group related items together. In the case of radio buttons, only one input with the same NAME value (mouse in this case) may be selected.

The second function of the NAME field is to the data returned from the form. The form may return a value1=value2 pair, where value1 is the value of the NAME field and value2 is the value of the VALUE field. In the above example, the form may return "name=en".

In an embodiment employing Intel™ processors or compatible processors, the well known INT 15H instruction may be employed to allocate a portion of memory to store the HTML encoded signals 512 so that they will be available to an operating system or application program once the operating system boots. A manner in which memory may be allocated using INT 15H is well known in the art. See, for example, "Advanced Configuration and Power Interface Specification",Revision 1.0B, Chapter 14 (www.teleport.com/~acpi) for a description of allocating a BIOS-protected area in RAM using INT 15h.

Instructions comprised by POST 595 may then store the HTML encoded signals 512 in a random access memory (RAM) of the computer system. Here they may be accessible by an operating system 513 or application program (such as setup program 514) on the computer system 500, in a manner well known in the art. See, for example, the Plug and Play BIOS Specification, Revision 1.0a, Compaq Computer Corporation, Phoenix Technologies, Limited, Intel Corp., May 5, 1994, www.microsoft.com/hwdev/respec/pnpspec-s.htm for a description of how to read the HTML from a BIOS-protected memory area at the top of RAM. The setup program 514 executing on the first computer system may employ GUI 581 supplied by OS 513 also executing on the first computer system.

The HTML encoded signals 512 may be transmitted to a second computer system by way of an external channel. In the illustrated embodiment 500, the external channel is comprised by network adaptor 585 and network cable 551. Of course, numerous other external channels as previously described may also be employed. Second computer system may execute a setup program to display and manipulate the active configuration signals of the first computer system in their HTML encoded form. New active configuration signals, encoded in HTML, may then be transmitted back to the first computer system by way of the external channel. First computer system may execute instructions (not shown) to decode new HTML signals transmitted from the second computer system and write the new active configuration signals comprised by the HTML signals back to CMOS 560. The new active configuration signals may then be applied to the first computer system when the first computer system is next powered on or reset.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A method comprising:
   generating a first signal defining 1) a location in a memory of a second signal, and 2) a length in the memory of the second signal, the first signal having a cross-platform encoding, wherein the second signal comprises configuration settings for a computing system; and
   storing the first signal such that it may be accessed by an application program and applying the second signal to the computing system upon at least one of power-on and reset, wherein the second signal is applied by existing boot operation instructions.

2. The method of claim 1 in which defining the location in the memory comprises defining an offset in the memory.

3. The method of claim 1 in which defining the location in the memory comprises defining an address in the memory.

4. The method of claim 1 in which the cross-platform encoding comprises:
   NAME and VALUE fields in an HTML form.

5. The method of claim 1 in which the memory is CMOS and the first signal is stored in RAM.

6. The method of claim 1 in which the application program executes in cooperation with an operating system.

7. An article comprising:
   a machine-readable memory having stored therein instructions which, when executed by a processor in a computer system, result in:
   generating a first signal defining 1) a location in a memory of a second signal, and 2) a length in the memory of the second signal, the first signal having a cross-platform encoding, wherein the second signal comprises system configuration settings; and
   storing the first signal such that it may be accessed by an application program and applying the second signal to the computing system upon at least one of power-on and reset, wherein the second signal is applied by existing boot operation instructions.

8. The article of claim 7 in which the cross-platform encoding further comprises:
   NAME and VALUE fields in an HTML form.

9. The article of claim 7 in which the memory is CMOS and the first signal is stored in RAM.

10. A computer system comprising:
    a processor;
    a machine-readable medium having stored thereon instructions which, when executed by the processor, result in:
    generating a first signal defining 1) a location in a memory of a second signal, and 2) a length in the memory of the second signal, the first signal having a cross-platform encoding, wherein the second signal comprises system configuration settings; and
    storing the first signal such that the first signal may be accessed by an application program and applying the second signal to the computing system upon at least one of power-on and reset, wherein the second signal is applied by existing boot operation instructions.

11. The system of claim 10 in which the cross-platform encoding comprises:
    NAME and VALUE fields in an HTML form.

12. The system of claim 10 in which the first memory is CMOS and the first signal is stored in RAM.

\* \* \* \* \*